Oct. 25, 1966  T. J. GIBBONS  3,281,158
WORK HOLDING CHUCKS

Filed Oct. 12, 1964  3 Sheets-Sheet 1

*Inventor*
Thomas J. Gibbons
By his Attorney
Vincent A. White

Oct. 25, 1966 T. J. GIBBONS 3,281,158
WORK HOLDING CHUCKS
Filed Oct. 12, 1964 3 Sheets-Sheet 2
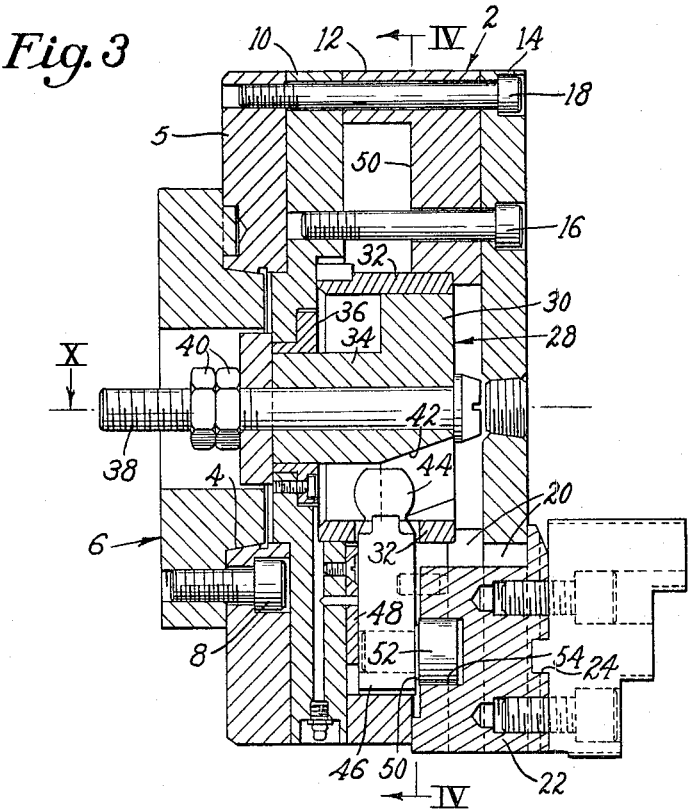
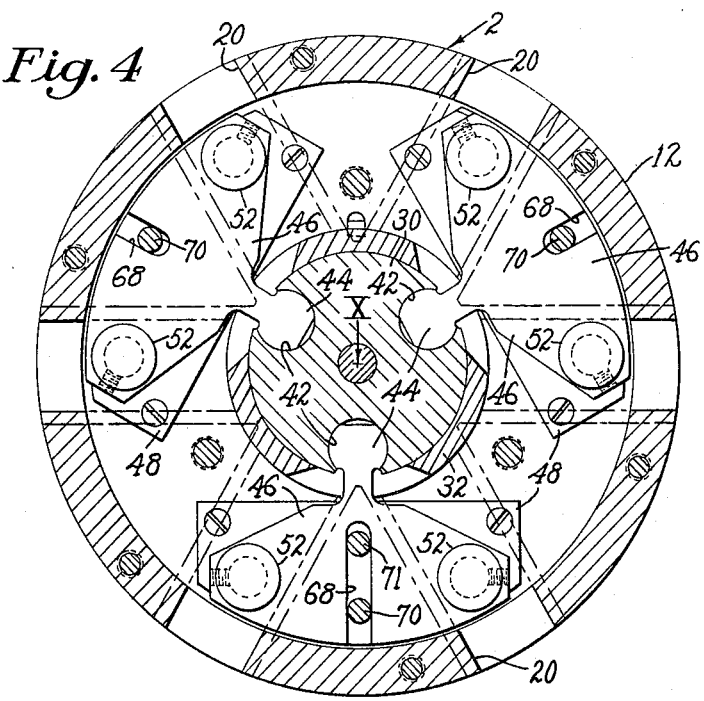

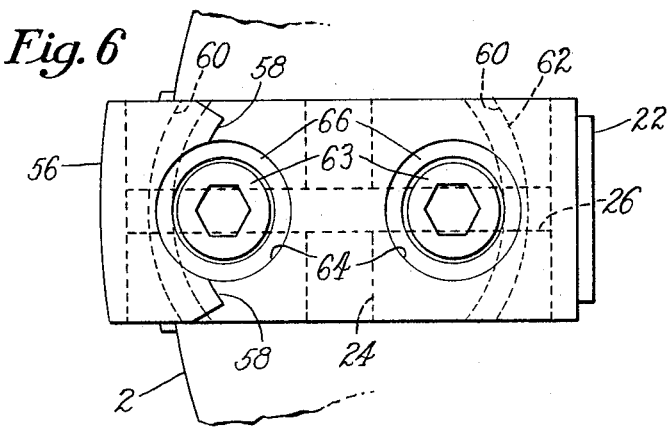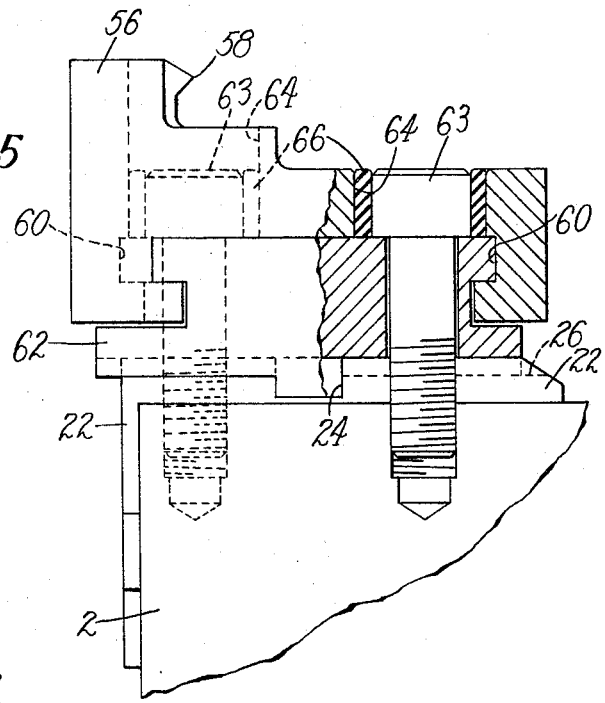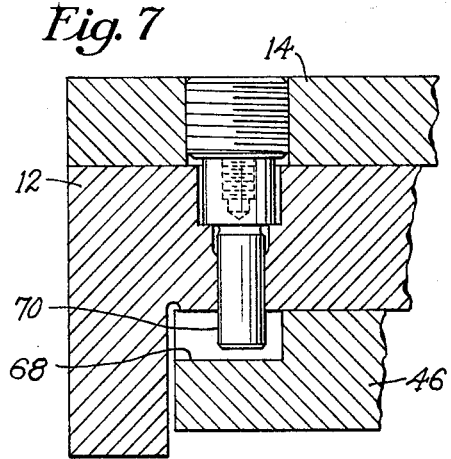

United States Patent Office 3,281,158
Patented Oct. 25, 1966

3,281,158
WORK HOLDING CHUCKS
Thomas J. Gibbons, Beverly, Mass., assignor to American Work Holding Co., Inc., Woburn, Mass., a corporation of Massachusetts
Filed Oct. 12, 1964, Ser. No. 403,177
8 Claims. (Cl. 279—121)

This invention relates to work holding chucks having movable jaws for centering workpieces relative to an axis of rotation. More particularly, the invention is directed to a chuck having means for connecting a plurality of jaws in pairs for equal radial movements while providing for limited relative movement between the jaws of each pair to compensate for unevenness in the contour of workpieces.

It is a principal object of the invention to provide an improved mechanism for actuating the jaws of a compensating jaw, work centering and holding chuck which due to its simplified construction is more reliable and less subject to wear than chucks of this type heretofore available. To this end the chuck of the present invention is provided with a main body rotatable about an axis and having radial guideways receiving a plurality of jaw slides. The main body is further provided with a member movable axially and which through slideways inclined from the axis of the chuck is pivotally connected to inner ends of actuators each also pivotally connected to a pair of the jaw slides. The pivotal connections between the member and the actuators are so arranged that upon axial movement of the member the pivotal connections move along the slideways to impart equal radial movements to each pair of jaw slides. Due to the pivotal connections of each actuator to a pair of jaw slides and to the member, each jaw slide is free to a limited extent to move independently until both jaw slides of each pair engage the workpiece with substantially equal force.

According to one feature of the invention, the inclined slideways of the axially movable member are formed of open sided bores which receive spherically shaped ends of the actuators to make pivotal connection therewith. Such connections are superior to T-slot or elongated slide connections commonly found in chucks of the pertinent prior art for both compensating and non-compensating jaw chucks. With T-slot and slide type of connections due to the large surface area in contact there can be as much as a 60 percent power loss involved in just overcoming high frictional forces and possible wedging action before clamping force can be applied by the chuck jaws. By utilizing ball type connections, frictional forces involved are low and there is no possibility of wedging action. This greatly reduces both the power required to operate the chuck as well as the space needed for the power applying devices. It should be obvious that this arrangement is especially advantageous in either compensating jaw chucks or in other types where there are direct connections with the jaw slides.

According to another feature of the invention a novel construction is provided for each work engaging jaw. Each jaw is mounted for limited rotation on its associated jaw slide to enable the jaw to accommodate itself to irregularities in the shape of a workpiece. To maintain the jaw centered on its slide while permitting it to rotate yieldably there is provided at least one pin centered in a hole by a resilient bushing, the resiliency of the bushing permitting movement of the pin in the hole to allow the jaw to rotate from its centered position.

The above and other objects and features of the invention together with various details of construction and novel combinations of parts will now be described with reference to the drawings and pointed out in the claims.

In the drawings,

FIG. 3 is a section taken substantially on line III—III of FIG. 1;

FIG. 4 is a section taken substantially on line IV—IV of FIG. 3;

FIG. 5 is a side elevation of a special type of compensating jaw;

FIG. 6 is a plan view of the jaw shown in FIG. 5; and

FIG. 7 is a section on line VII—VII of FIG. 1.

Figure 1:
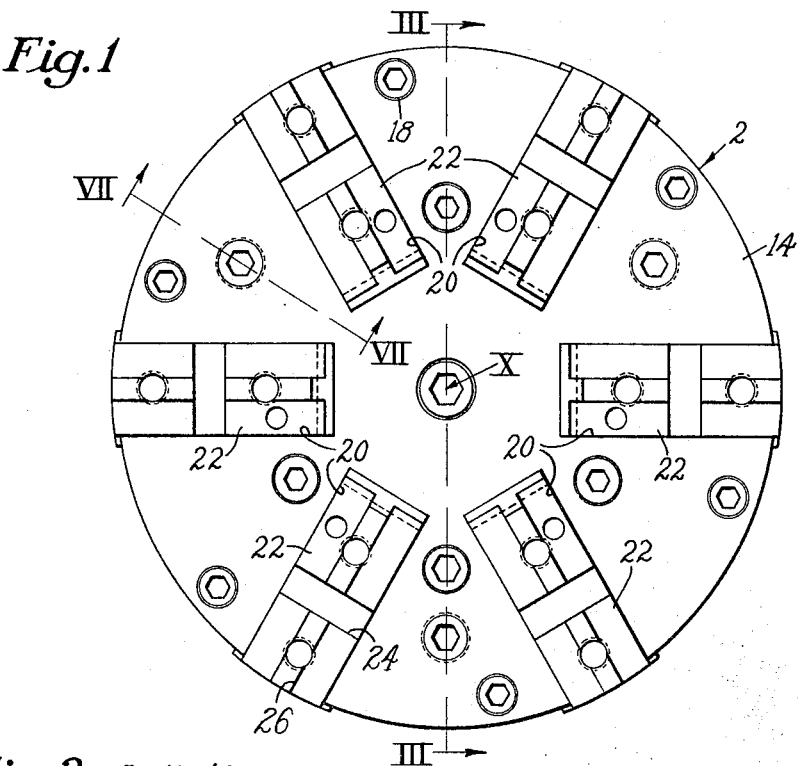
FIG. 1 is a front elevation of a chuck embodying the present invention.
Figure 2:
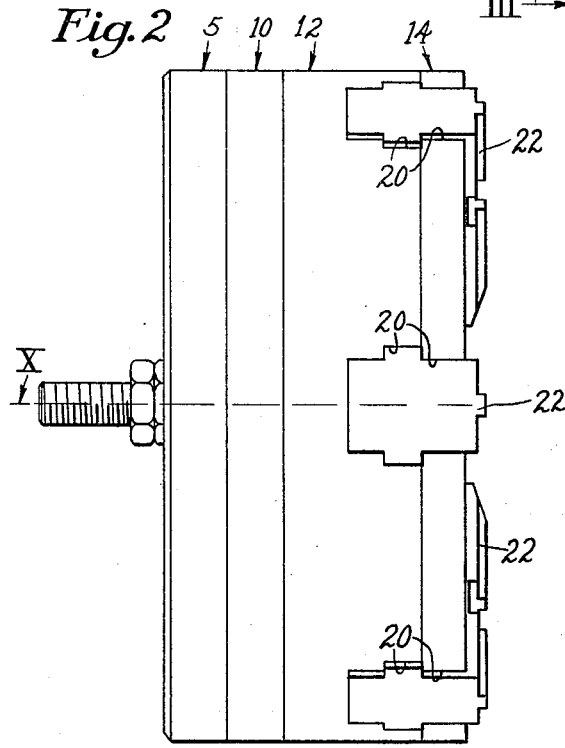
FIG. 2 is a side elevation of the chuck.

Referring to the drawings there is illustrated a compensating jaw chuck embodying the present invention. The chuck comprises a body portion 2 having a tapered bore 4 (FIG. 3) in a face plate member 5 adapted to be received on a complementary tapered portion of a spindle 6 of a rotary machine tool (not shown). The face plate 5 may be secured to the spindle by screws 8 one of which is shown in FIG. 3. Since the spindles of rotary machine tools vary considerably in both locating and securing means, it should be obvious that the locating and fastening means for the face plate may also vary considerably from that shown. As illustrated, the chuck and spindle are adapted to be rotated about an axis X.

The chuck body, according to the present embodiment is formed of a series of plates 10, 12 and 14 secured together by bolts 16 with the assembly being secured to the face plate by bolts 18. The plates 12 and 14 have formed therein a plurality of radially extending guideways 20 adapted to receive and guide a plurality of jaw slides 22 for radial movement toward and away from the axis X. Each jaw slide is provided with appropriate keyways 24, 26 for positioning a work holding jaw suitably shaped to the work to be centered and secured in the chuck. One special type of jaw that may be utilized is illustrated in FIGS. 5 and 6 and will be hereinafter described, but it should be understood that a wide variety of jaws for both inside and outside gripping may be used without departing from the scope of the invention.

The chuck is further provided with a central member 28 guided for axial movement along the axis X. A flange-like portion 30 of the member 28 is guided by a sleeve 32 received in suitable central bores in the plates 10 and 12 and a portion 34 of reduced diameter is guided in a bushing 36 fixed in the plate 10. For reciprocating the member 28 axially of the chuck, a bolt 38 is secured thereto by nuts 40 and has a threaded portion extending rearwardly from the chuck by which the member 28 may be connected to any suitable source of reciprocating motion such as an air motor (not shown). It should be obvious that any suitable source of power including a hand operated device may be used to move the member 28 axially of the chuck. The portion 30 of the member 28 is provided with open sided cylindrical bores 42 inclined longitudinally of the axis X to form slideways each adapted to receive a ball shaped end 44 of an actuator 46. In this manner each actuator is both slideably and pivotally connected to the member 28. The actuators are guided for movement in a plane substantially normal to the axis X by plates 48 secured to the plate 10 and by a parallel surface 50 on the plate 12. Axial movement of the member 28 to the right or left as seen in FIG. 3 causes the slideways 42 to slide along the ball ends 44 imparting radial movements to the actuators 46. Rather than follow the construction now to be described, the actuator could be directly connected to only one jaw slide 22 where it is desired that the chuck be of the non-compensating type and still have the advantages of my invention without departing from its scope.

Each actuator extends between a pair of adjacent jaw slides 22 and is also provided with a pair of rolls 52 received in slots 54 in each of the pair of jaw slides. In this manner each actuator is both pivotally and slideably connected to a pair of jaw slides. Thus, axial movement of the member 28 imparts substantially equal radial movements through the actuators to each pair of jaw slides. Movement of the member 28 to the left as seen in FIG. 3 causes the jaw slides to be moved radially toward axis X to grip the exterior of a workpiece while movement of the member to the right would cause jaw slide movement away from the axis to open the jaws or to grip a workpiece by interior surfaces. Due to the pivotal connections of each actuator to a pair of jaw slides and to the slideways of the member 28, each jaw slide of a pair is free to a limited extent to move independently until the jaws on both sides of each pair engage a workpiece in the chuck with substantially equal force. Thus, while substantially equal movements are imparted to the jaws by pairs to centralize a workpiece in the chuck there is provision for limited independent compensating movement of each jaw of a pair to accommodate roughness or unevenness of the contour of the workpiece so each jaw will apply substantially equal centering force to the workpiece. To provide additional compensating movement between pairs of jaws the member 28 is free to a limited extent to rotate about the axis X, thus ensuring that all pairs of jaws will apply substantially equal force to the workpiece.

It is desirable and often necessary when centering some workpieces in a chuck that equal centering movements be imparted to all jaws and that no individual compensating movement of any jaw be permitted. This is especially true when a ringlike part is already distorted or is easily distorted by unequal clamping action, requiring that equal centering movements of all jaws be obtained to "true up" the workpiece before it can be machined concentric with the contour by which it is gripped. To this end each actuator 46 is provided with a slot 68 adapted to receive a removable pin 70 extending inwardly from the plate 12. One of the slots 68 is elongated to receive another pin 71 to prevent any rotation of member 28. With this arrangement the actuators can move only radially upon axial movement of the member 28 since the pins 70 prevent pivoting of the actuators in the slideways 42. Thus, only equal radial movements can be imparted to the jaw slides by the actuators. The pins 70 are adapted to be easily removed or inserted as seen from the construction shown in FIG. 7. By inserting the pins 70, the chuck can easily be converted from a compensating jaw chuck to a simple centering chuck without compensating jaw action. Other means for preventing pivoting of the actuators on the member 28 could be used without departing from the scope of the invention.

Referring to FIGS. 5 and 6 there is shown a special form of jaw which may be mounted on a jaw slide 22 to provide additional compensating movement for each jaw in addition to that described above. To this end a jaw 56 is provided with two work engaging lugs 58. The jaw is provided with circular guideways 60 which are received on a complementary circular guide member 62 secured to the jaw slide 22 by bolts 63 at opposite sides of the center of the guide surfaces an having suitable keys adapted to locate the member 62 on the jaw slide by means of the locating keyways 24, 26. In this manner the jaw is guided for swinging movement on its associated jaw slide to accommodate itself to the contour of a workpiece. To maintain the jaw in a central position on the slide the heads of the bolts 63 extend into holes 64 in the jaw. Bushings 66 of resilient material in the holes act to yieldably center the holes with respect to the bolt heads and thus also center the jaw on the slide. Upon radial movement of the jaw slide, the lugs 58 are moved into engagement with the contour of a workpiece. Due to the resiliency of the bushings 66, the jaw is free to a limited extent to swing on the guide 62 so the lugs may engage the workpiece with substantially equal force. Obviously, a preferred embodiment of the compensating jaw has been shown and described and other means could be used such as a simple pivot pin to permit the jaw to swing on the slide. Furthermore, other yieldable means including a single pin or lug centered in an opening could be used to provide a yieldable centering action for the jaw without departing from the scope of the invention.

Some changes may be made in the construction and arrangement of the parts above described without departing from the real spirit and purpose of my invention and it is my intention to cover by the following claims any modified forms of structure or use of mechanical equivalents which may be reasonably included within their scope.

Having thus described my invention, what I claim as new and desire to secure by Letters Patent of the United States is:

1. A work-holding chuck comprising a body, rotatable about an axis and having radially extnding guideways, a plurality of jaw slides mounted in said radial guideways for movement toward and away from said axis, a member movable axially in said body and having slideways extending in directions longitudinally inclined relative to said axis, and actuators connecting said jaw slides by pairs to said member, each actuator extending between and being pivotally connected to a pair of jaw slides and also being pivotally connected to said member by one of said slideways, said member as it is moved axially acting to impart equal radial movements to said actuators as their pivotal connections move along the inclined slideways, the pivotal connections of each actuator with said member and a pair of jaw slides permitting compensating movement between each jaw slide of a pair while equal radial movement is imparted to all pairs of jaw slides.

2. A chuck according to claim 1 in which each actuator is pivotally connected to said member by a portion received in one of said slideways.

3. A chuck according to claim 2 in which said member is free to a limited extent to rotate for providing additional compensating movement between pairs of jaws.

4. A chuck according to claim 1 in which said actuators are guided in said body for movement along a plane perpendicular to said axis.

5. A chuck according to claim 1 in which the slideways in said member are formed in open-sided cylindrical bores and said actuators have spherically shaped portions received in said bores for pivotally connecting the actuators to said member.

6. A chuck according to claim 1 in which each actuator is provided with a slot extending radially of said body, and said body is provided with bores adjacent the actuators for receiving pins adapted to extend into the slots in the actuators for preventing pivotal movement between the actuators and said member thereby causing equal radial movements to be imparted to all of said jaw slides upon axial movement of said member.

7. A chuck according to claim 1 in which each actuator comprises a rigid piece which is pivotally and slideably connected to said member and which extends from said member and is pivotally and slideably connected to each of a pair of said jaw slides.

8. A work holding and centering chuck comprising a body rotatable about an axis and having radially extending guideways, a plurality of jaw slides mounted in said radial guideways for movement toward and away from said axis, a member movable axially in said body and having open sided cylindrical bores forming slideways extending longitudinally inclined relative to said axis, and actuators each having spherically shaped ends received in said guideways and connected to at least one of said jaw slides for imparting radial movement thereto upon axial movement of said member.

References Cited by the Examiner

UNITED STATES PATENTS

| | | | |
|---|---|---|---|
| 2,704,214 | 3/1955 | Beausoleil | 279—121 |
| 2,815,959 | 12/1957 | Vandenberg | 279—123 |
| 2,921,796 | 1/1960 | Ernest | 279—119 X |
| 2,954,983 | 10/1960 | Roby | 279—121 |
| 3,009,374 | 11/1961 | Foreman | 279—119 X |
| 3,020,058 | 2/1962 | Feldman | 279—123 |

FOREIGN PATENTS 920,494  1/1947  France.

ROBERT C. RIORDON, *Primary Examiner.*

H. V. STAHLHUTH, *Assistant Examiner.*